May 21, 1940.    G. W. CASTEEL    2,201,643
MEANS FOR PROTECTING TREES FROM INSECTS
Filed June 22, 1937
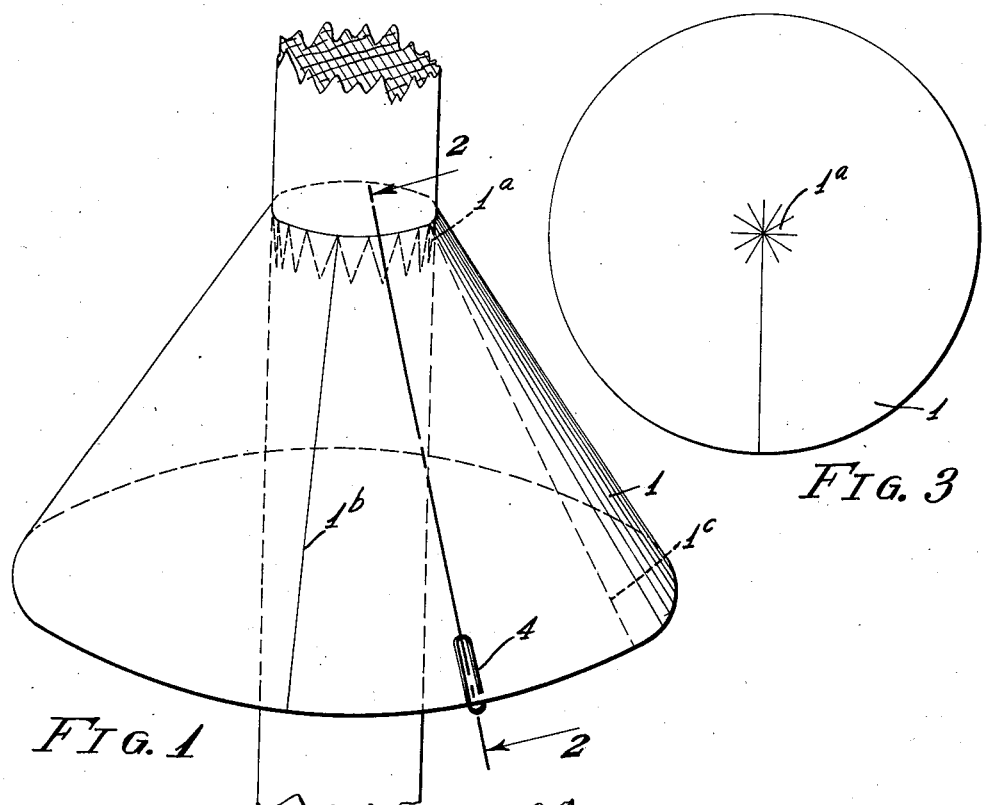
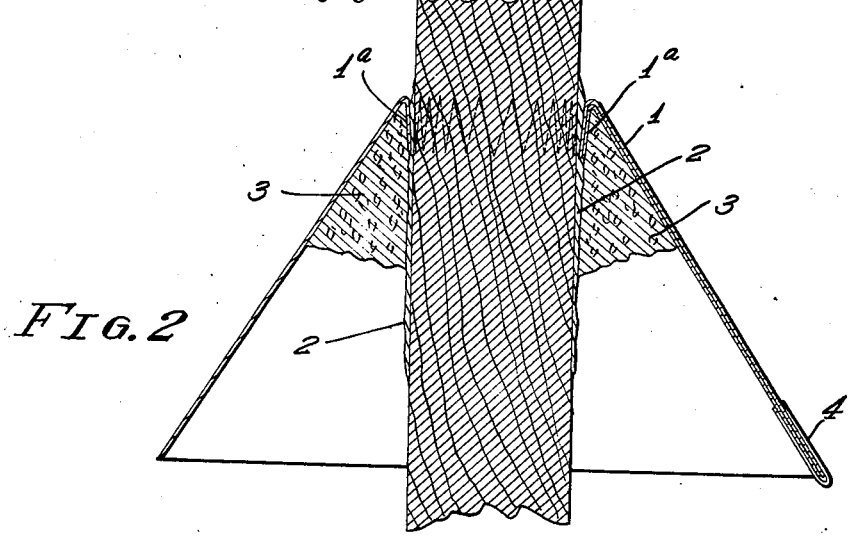
INVENTOR.
George W. Casteel
BY
A. B. Bowman
ATTORNEY.

Patented May 21, 1940

2,201,643

UNITED STATES PATENT OFFICE 2,201,643

MEANS FOR PROTECTING TREES FROM INSECTS

George W. Casteel, Lemon Grove, Calif.

Application June 22, 1937, Serial No. 149,636

2 Claims. (Cl. 43—108)

My invention relates to a means for protecting trees from insects that crawl up the body of the tree, such as ants or the like; to prevent such insects from injuring the trees and the fruit thereon, and the objects of my invention are:

First, to provide a means for protecting and supporting an insect deterrent compound against the sun, rain, and other weather conditions:

Second, to provide a substantial barrier in connection with said protective means for insects crawling up or down on the body of the tree;

Third, to provide a novel means of securing insect protecting means around a trunk of a tree;

Fourth, to provide a means of this class which is so constructed and arranged that it provides for the growth of the tree over a considerably extended period without disarranging or affecting the operation of said tree protecting means;

Fifth, to provide a means of this class which may be used in connection with the various kinds of insect deterrent compounds that are now used around the body or trunks of trees, in adhesive and elastic form for protecting said adhesive compounds from deterioration caused by weather conditions.

Sixth, to provide a means of this class which is very simple and economical of construction, easy to apply, efficient in its action and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a perspective view of a fragmentary portion of a tree body showing my means for protecting trees from insects positioned thereon ready for use; Fig. 2 is a fragmentary sectional view from the line 2—2 of Fig. 1; and Fig. 3 is a top or plan view of the means on a reduced scale in flat form before being placed on the tree.

Similar characters of reference refer to similar parts and portions throughout the several views of the drawing:

My means consists of a hood member 1 in which is cut along its normally upper edge a plurality of slits to form pointed members 1a and shown best in Fig. 3 of the drawing. And these pointed members 1a are folded downwardly as shown best in Fig. 2 of the drawing and the hood is wrapped around the tree with these pointed members extending downwardly and resting flat around the body of the tree. However, before the hood member is placed in this position the outer surface of the tree, both above and below the place where the pointed portion is applied, is covered with an adhesive, resilient, deterrent compound 2 which may be of any conventional type, (some is now sold as Tanglefoot) which is adhesive enough to cling to the bark of the tree and elastic enough to expand with growth of the tree. These pointed members are positioned against the outer surface and pressed hard enough so that the pointed surfaces are embedded in this deterrent compound 2 as shown best in Fig. 2 of the drawing, thus holding the hood member securely in position and also preventing insects from crawling up on the inside of the hood 1. Then positioned on the inside of the extended portion of the hood and between the extended portion of the compound 2 is provided a bunch of hair felt 3 which is also additionally supported by means of the compound 2 into which it is pressed at its inner side, thus providing further deterrent and causing entanglement of insects and preventing them from crawling between the trunk of the tree and the hood, or between the hood and the trunk of the tree.

The hood member 1 is provided with a substantial overlapped portion extending from 1b to 1c. This provides a frusto-conical hood with a large overlapped portion. This overlapped portion is connected with the main portion by means of a clip member 4 which may be made of any form. The one shown is similar to the conventional paper clip for connecting two or more pieces of paper together.

Though I have shown and described a particular construction, combination and arrangement of parts and portions, I do not wish to be limited to this particular construction, combination, and arrangement but desire to include in the scope of my invention, the construction, combination, and arrangement substantially as set forth in the appended claims.

Having thus described my invention what I claim as new and desire to secure by Letters Patent is:

1. In a means for protecting trees from insects, a frusto-conical hood member overlapped to provide for expansion provided with a plurality of points turned downwardly at the center and extending around the trunk of a tree in spaced relation from the ground, a bunch of hair felt positioned around the trunk of the tree with its lower side some distance from the lower side of said hood member, and extending to the juncture between the main portion and the downwardly extended pointed portion of said frusto-conical hood member, and an insect protective adhesive and resilient compound positioned between the trunk of the tree and said downwardly extended pointed portion of said front of said frusto-conical hood member and said hair felt and in which the downwardly extended points and said hair felt are partially embedded adapted to yieldably hold said hood in position on said tree trunk.

2. In a means for protecting trees from insects, a frusto-conical hood member overlapped to provide for expansion provided with a plurality of points turned downwardly at the center and extending around the trunk of the tree in spaced relation from the ground, and a protective adhesive and resilient compound positioned between the trunk of the tree and said downwardly extended pointed portion of said frusto-conical hood member and extending in a layer upwardly therefrom and downwardly therefrom on said tree trunk and in which the downwardly extending points are partially embedded.

GEORGE W. CASTEEL.